United States Patent
Schuck et al.

(10) Patent No.: US 9,554,125 B2
(45) Date of Patent: *Jan. 24, 2017

(54) WIDE FIELD-OF-VIEW STEREOSCOPIC PROJECTION SYSTEM

(71) Applicant: RealD Inc., Beverly Hills, CA (US)

(72) Inventors: Miller H. Schuck, Erie, CO (US); Michael G. Robinson, Boulder, CO (US); Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,382

(22) Filed: Dec. 10, 2015

(65) Prior Publication Data

US 2016/0100157 A1    Apr. 7, 2016

Related U.S. Application Data

(63) Continuation of application No. 13/010,755, filed on Jan. 20, 2011, now Pat. No. 9,223,142.
(Continued)

(51) Int. Cl.
*G02B 15/177* (2006.01)
*H04N 13/04* (2006.01)
(Continued)

(52) U.S. Cl.
CPC ........ *H04N 13/0459* (2013.01); *G02B 15/161* (2013.01); *G02B 15/177* (2013.01); *G02B 27/22* (2013.01); *G02B 27/26* (2013.01); *G03B 21/14* (2013.01); *G03B 35/20* (2013.01); *G03B 35/26* (2013.01); *H04N 13/0431* (2013.01); *H04N 13/0434* (2013.01)

(58) Field of Classification Search
CPC .......... G03B 21/00; G02B 27/22; G02B 13/02
USPC ......................................... 353/7–9
See application file for complete search history.

(56) References Cited

U.S. PATENT DOCUMENTS 5,914,818 A    6/1999   Tejada
5,993,004 A    11/1999  Moseley et al.
(Continued)

FOREIGN PATENT DOCUMENTS

EP    0745879 A2    12/1996
EP    1235092 A2    8/2002
(Continued)

OTHER PUBLICATIONS

International search report and written opinion of international searching authority in co-pending PCT/US2011-021944 mailed Oct. 17, 2011.

*Primary Examiner* — Renee Chavez
(74) *Attorney, Agent, or Firm* — Penny L. Lowry; Neil G. Mothew

(57) ABSTRACT

Disclosed embodiments relate to a stereoscopic projection system and methods. An exemplary disclosed projection system includes an optical component disposed between the lenses of a lens arrangement. An exemplary lens arrangement includes a first power group, a second power group, and an aperture stop. In an embodiment, the optical component is disposed between the first power group and the aperture stop. In an exemplary embodiment, the optical component is proximate to the aperture stop. By disposing the optical component closer to or proximate to the aperture stop in the lens arrangement, various benefits may be realized, including improved contrast uniformity.

19 Claims, 3 Drawing Sheets

Related U.S. Application Data

(60) Provisional application No. 61/296,764, filed on Jan. 20, 2010.

(51) Int. Cl.
*G02B 27/22* (2006.01)
*G02B 27/26* (2006.01)
*G03B 21/14* (2006.01)
*G03B 35/20* (2006.01)
*G03B 35/26* (2006.01)
*G02B 15/16* (2006.01)

(56) References Cited

U.S. PATENT DOCUMENTS

| | | |
|---|---|---|
| 6,363,225 B1 | 3/2002 | Sugawara |
| 7,528,906 B2 | 5/2009 | Robinson |
| 2007/0024983 A1 | 2/2007 | Yamamoto |
| 2008/0143964 A1 | 6/2008 | Cowan et al. |
| 2009/0128780 A1 | 5/2009 | Schuck |

FOREIGN PATENT DOCUMENTS

| | | |
|---|---|---|
| JP | 207-233152 A | 9/2007 |
| WO | 2006038744 A1 | 4/2006 |

WIDE FIELD-OF-VIEW STEREOSCOPIC PROJECTION SYSTEM

CROSS REFERENCE TO RELATED APPLICATIONS

This application is a continuation of U.S. patent application Ser. No. 13/010,755, entitled "Wide field-of-view stereoscopic projection system," filed on Jan. 20, 2011, which claims priority to U.S. Provisional Appl. Ser. No. 61/296,764, entitled "Wide field-of-view stereoscopic projection system," filed on Jan. 20, 2010, which are all hereby incorporated by reference in their entirety for all purposes.

TECHNICAL FIELD

The present disclosure generally relates to projection systems, and more specifically, to stereoscopic projections systems.

BACKGROUND

Stereoscopic systems operate by presenting two distinct images to a viewer. Filtering may be utilized to present one image to one eye, and the second image to the other eye. Filtering may employ polarization or spectral-division methods to separate the two images.

One example of a widely-implemented stereoscopic projection system is the ZScreen (manufactured by the assignee, RealD). The ZScreen includes a liquid-crystal based polarization switch located at the output of a projection lens. The ZScreen alternates the polarization state of the outgoing light between two orthogonal polarization states in synchronization with the display of the left and right eye images at the projection panel. Spectacles (or eyewear) pass orthogonal polarization states to each eye and complete the filtering function.

SUMMARY

An embodiment in accordance with the present disclosure includes a projection system operable to provide stereoscopic images. The projection system may include a lens arrangement comprising a first power group, a second power group, and an aperture stop disposed between the first and second power groups. The projection may further include an optical component disposed between a first lens of the first power group and a second lens of the second power group.

Another embodiment in accordance with the present disclosure includes a projection system operable to provide stereoscopic images. The projection system may comprise a panel operable to output light along a light path, and a lens arrangement disposed in the light path. The lens arrangement may include a first power group, a second power group, and an aperture stop disposed between the first and second power groups. The projection system may also include an optical component, the optical component disposed in the light path between a first lens of the first power group and a second lens of the second power group. The projection system may further include a projection screen operable to receive light provided by the lens arrangement along the light path. In sonic embodiments, the projection system may have a second lens arrangement operable to receive light from the panel along a second light path, and the lens arrangement comprises a first power group, a second power group, and an aperture stop disposed between the first and second power groups of the second lens arrangement. The projection may include a second optical component, the second optical component disposed in the second light path between a first lens of the first power group of the second lens arrangement and a second lens of the second power group of the second lens arrangement, wherein the projection screen is operable to receive light provided from the second lens arrangement along the second light path.

An exemplary embodiment in accordance with the present disclosure includes a method of projecting stereoscopic images on a screen. The method may include providing a light panel, directing light from the light panel through a lens arrangement and an optical component, and directing light exiting the lens arrangement to toward the screen. In an embodiment, the lens arrangement comprises a first power group, a second power group, and an aperture stop disposed between the first and second power groups, wherein the optical component is disposed between a first lens of the first power group and a second lens of the second power group.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
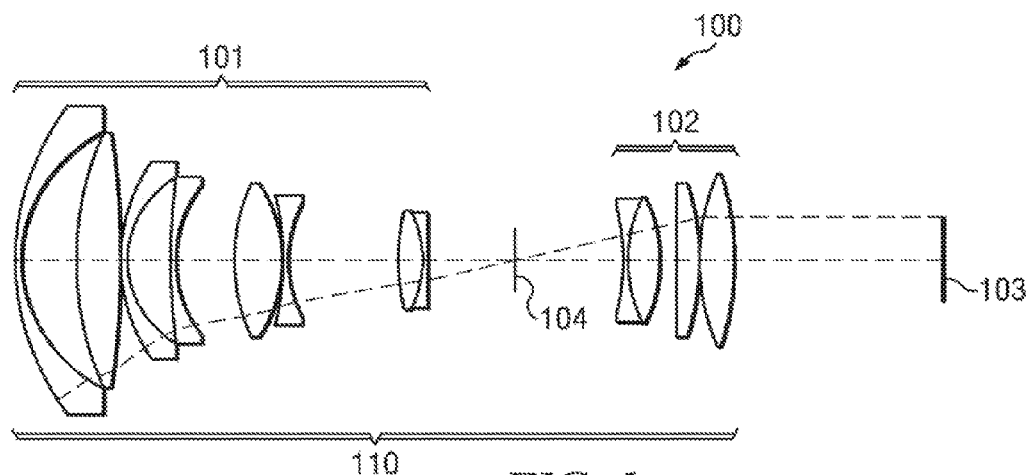
FIG. 1 is a schematic diagram illustrating conventional projection lenses.

FIG. 1 is a schematic diagram illustrating a side view of projection system 100, as described in U.S. Pat. No. 5,914,818, which is hereby incorporated by reference. The projection system 100 includes a lens arrangement 110, which includes a negative power group 101 near a screen (not shown) and a positive power group 102 near the panel. The lens arrangement 110 is in a reverse-telephoto arrangement, which allows a long back focal length for accommodating illumination, polarization, and/or color management components. In an embodiment, the projection lenses may be telecentric at the panel 103 to ensure uniformity in contrast and illumination. An aperture stop 104 may be implemented to control stray light and maintain high contrast.

Figure 2:
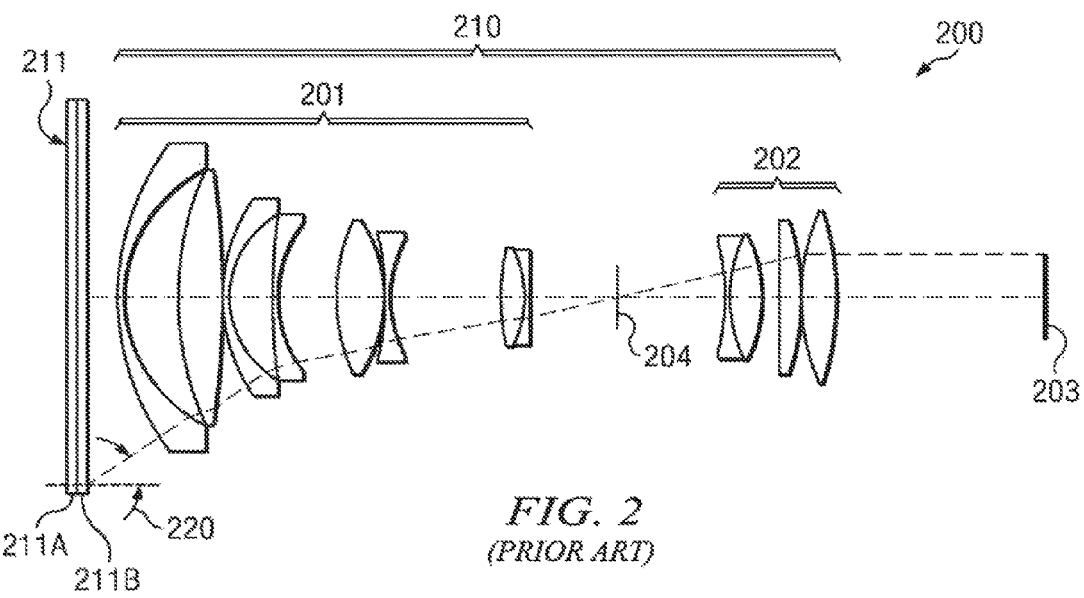
FIG. 2 is a schematic diagram illustrating an exemplary embodiment of a projection system in accordance with the present disclosure.

FIG. 2 is a schematic diagram illustrating a side view of an exemplary embodiment of a projection system 200 in accordance with the present disclosure. The projection system 200 includes a filtering element 201 disposed outside of the lens arrangement 110. In an exemplary embodiment, the filtering element 201 may include a polarization switching Zscreen that includes a pre-polarizer 201A and a liquid-crystal switching element(s) 201B. As shown, the pre-polarizer 201A is located between the projection lens of the lens arrangement 110 and the liquid-crystal switching element(s) 201B. At the ZScreen 201, the angle of incidence 202 for a chief ray emerging from a pixel at the edge of the panel 103 is large. The liquid crystal cell retardation (or phase difference between orthogonal polarization states) differs for very large angles of incidence (AOI's) versus a ray passing through the center of the ZScreen 201, which has 0° AOI. This variation in retardation with AOI implies that stereo contrast, which may be defined by the brightness of the transmitted polarization state relative to the leakage brightness of the orthogonal polarization state, is not uniform from center to edge of the image. As the angle of incidence gets larger (i.e. the system field-of-view increases), the non-uniformity increases.

In addition, the overall stereo contrast in the image can decrease with increasing field-of-view. As the contrast non-uniformity increases, the integrated (or overall) stereo contrast can decrease.

One embodiment that may reduce stereo contrast non-uniformity with wider field-of-view may involve disposing the optical component, such a switching element, at a plane in the projection lens where the angles of incidence are lower than those outside the lens. In an exemplary embodiment, a suitable location is within the lens arrangement. In another embodiment, a suitable location is near the aperture stop of the projection lens.

Figure 3:
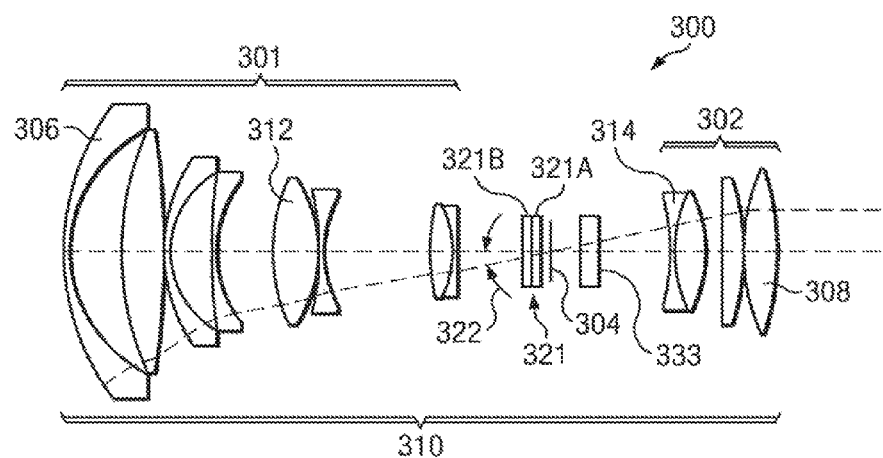
FIG. 3 is a schematic diagram illustrating another exemplary embodiment of projection system in accordance with the present disclosure.

FIG. 3 is a schematic diagram illustrating an exemplary embodiment of a projection system 300 operable to provide stereoscopic images in accordance with the present disclosure. The projection system 300 includes a lens arrangement 110 having a first power group 101, a second power group 102; and an aperture stop 104 disposed between the first and second power groups 101, 102. The projection system may further include an optical component 301 disposed between a first lens 106 of the first power group 101 and a second lens 108 of the second power group 102. The lens arrangement 110 may be configured in a variety of ways. In the illustrated embodiment, the first power group 101 may be a negative power group and the second power group 102 may be a positive power group. In an exemplary embodiment, the first power group 101 may be a positive power group and the second power group 102 may a negative power group.

It is to be appreciated that by disposing the optical component 301 within the lens arrangement 110, the angles of incidence may be lowered. The location of the optical component 301 within the can varied depending on the amount of non-uniformity that may exist and the internal space within the lens arrangement 110 available. In an embodiment, the first power group 101 further includes a second lens 112 disposed between the aperture stop 104 and the first lens 106 of the first power group 101, and the optical component 301 is disposed between the first and second lenses 106, 112 of the first power group 101. In an embodiment, the optical component 301 is disposed between the first power group 102 and the aperture stop 104. In another embodiment, the optical component 301 may be disposed proximate or directly adjacent to the aperture stop 104 to minimize the angle of incidence and the non-uniformity that may result therefrom.

It is further to be appreciated that more than one optical component may be disposed within the lens arrangement 110. In an embodiment, the projection system 300 may further comprises a second optical component 303 disposed between the second power group and the aperture stop. In an embodiment, the second power group 102 may further include a second lens 114 disposed between the aperture stop 104 and the first lens 108 of the second power group 102, and the projection system 100 may further include a second optical component (not shown) disposed between the first and second lenses 104, 108 of the second power group 102. In another embodiment, the projection system 100 may include a second optical component (not shown) between the second power group 102 and the aperture stop 104. For example, the second optical component (not shown) may be adjacent to the aperture stop 104.

It is to be appreciated that the optical component 301 or 303 of the projection system 100 may be any optical component that has an angular dependency in its performance or is susceptible to defects, such as dust, scratch, void, and other irregularities. A few examples such optical components include a modulator, a polarization switch, a color modulator, and a dichroic filter. Further examples include: achromatic polarization switches described in commonly-owned U.S. Pat. No. 7,528,906, which is hereby incorporated by reference; polarized color wheels described in commonly-owned U.S. patent appl. Ser. No. 11/732,302 and Ser. No. 11/732,303, which are hereby incorporated by reference; polarization modulators described in commonly-owned U.S. patent appl. Ser. No. 11/583,243 and Ser. No. 12/118,640, which are hereby incorporated by reference. Other examples may include the optical components described below, all of which suffer from its angular-dependency in its performance.

A spectral-division approach can suffer from stereo contrast non-uniformity with increasing field-of-view. The bandpass location(s) of dielectric film stacks may shift with angle-of-incidence, allowing light leakage from the left-eye image to the right-eye image (and vice-versa). Most dielectric film stack implementations place the filtering in the illumination path (versus outside the projection lens) to reduce this issue. If spectral-division is accomplished by retarder film stacks, stereo contrast uniformity also decreases with increasing field-of-view. Similar to liquid-crystal cells, retardation differs between a large angle of incidence (AOI) and a ray passing through the center of the ZScreen (0° AOI). Spectral-division retarder film stacks placed outside the projection lens arrangement 110 are susceptible to non-uniformities and lower contrast in the image.

Moreover, retarder and polarizer film stacks as described in U.S. Patent Pub. Appl. No. 2009/0128780, which is hereby incorporated by reference, can be implemented on a spinning wheel to produce alternating orthogonal polarization states. This "wheel" polarization switch may also suffer some stereo contrast non-uniformity with increasing field-of-view. Again, the film retardation may vary from normal incidence to large angles of incidence. If the wheel is located outside of the projection lens arrangement 110, non-uniformities may be visible in the resulting stereo image. Additionally, the size of the wheel may need to be large to capture the patch of light emerging from the projection lens.

In embodiments where the distance from the projector 100 to the screen is short (also know as "short throw"), ray bundles emerging from the projection lens will be more converging than bundles from a less focused for in long throw embodiments. Aberrations due to the insertion of a plate, such an optical switch, in the beam increase as the beam convergence increases. In an embodiment in which the plate is tilted to avoid light reflected from the plate re-emerging in the image as noise, the aberrations will increase with the higher angles of incidence at the plate.

Finally, in embodiments suitable for a small throw ratio (e.g., home theatre, or more immersive modern theatre auditoriums), the output of the projection lens in the arrangement 110 may be highly divergent, and the light patch in closest proximity to the arrangement 110 is frequently quite large. So, in addition to angle dependence of performance, the polarization switch becomes physically cumbersome and relatively costly.

As discussed above, the overall stereo contrast in the image can decrease with increasing field-of-view. As the contrast non-uniformity increases, the integrated (or overall) stereo contrast can decrease. This reduction in stereo contrast uniformity with wider field-of-view may also occur with multiple stacks of liquid-crystal cells and film compensated liquid-crystal systems. The ZScreen is an example of a multiple liquid-crystal cell system. In the illustrated embodiment, the optical component 301 may be a polarization modulator, such as a ZScreen. The ZScreen 301 may include a pre-polarizer 301A that precedes the liquid-crystal (LC) switching element(s) 301B in the optical path. The pre-polarizer 301A and the In an embodiment, the LC switching element 301 B may each include a plurality of subcomponents, and may be configure as one integral component or two modular components. In an embodiment, the pre-polarizer 301A and the LC switching element 301B may be spaced from each other to avoid transfer of heat between the subcomponents of the ZScreen 301.

By placing the ZScreen 301 or any other suitable optical component inside the lens arrangement 110 (e.g., proximate to the aperture stop 104), the angle of incidence 302 of the chief ray emerging from a panel's edge (not shown) may be reduced. In some embodiments, the result is better contrast uniformity from center to edge of the resulting image, and better integrated contrast in the image. An additional benefit of placing the optical component 301 or 303 near the aperture stop 104 may be a reduction in image artifacts created by physical defects or variations in the optical component 301 or 303.

For high contrast in polarization-based systems, the optical elements following the optical component 301 or 303 may be configured to have very low birefringence so as not to alter the polarization states projected to the screen (not shown). In some embodiments, this implies that the lens in the lens arrangement 110 may have materials, coatings and mounting that reduces birefringence for rays passing through the system 300.

Figure 4:
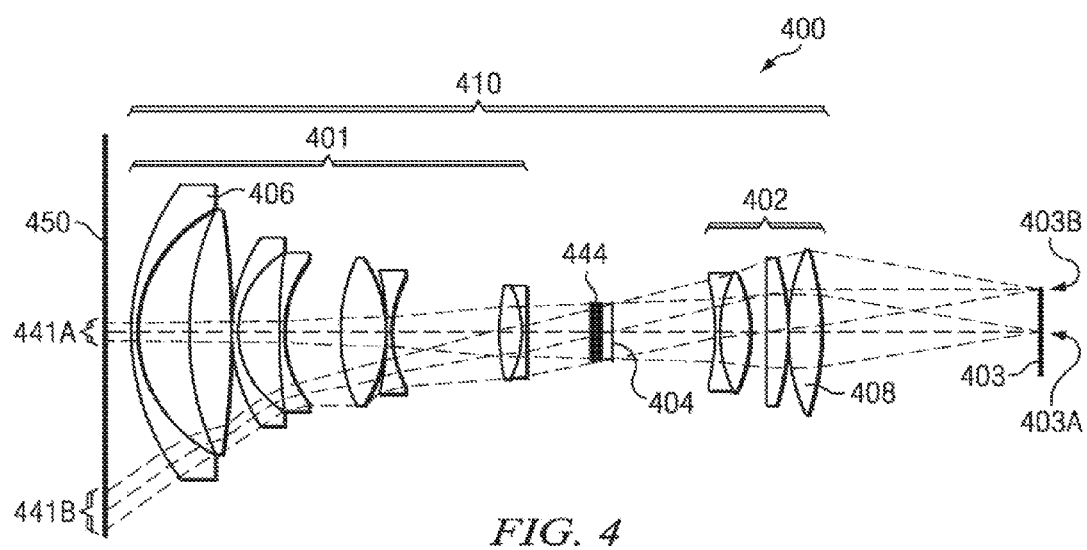
FIG. 4 is a schematic diagram illustrating yet another exemplary embodiment of projection system in accordance with the present disclosure.

FIG. 4 is a schematic diagram illustrating yet another exemplary embodiment of projection system 400 operable to provide stereoscopic images in accordance with the present disclosure. The projection system 400 includes a panel 103 operable to output light along alight path and a lens arrangement 110 disposed in the light path. The lens arrangement may include a first power group 101, a second power group 102, and an aperture stop 104 disposed between the first and second power groups 101, 102. The projection system 400 may include an optical component 404 disposed in the light path between a first lens 106 of the first power group 101 and a second lens 108 of the second power group 102. The projection system 400 may further include a projection screen 401 operable to receive light provided by the lens arrangement 110 along the light path.

In the embodiment shown in FIG. 4, telecentric ray bundles emerge from the center 103A and edge 10313 of the panel. The ray bundles may overlap at the aperture stop 104. If a switching element 404 is disposed closer to or proximate to the aperture stop 104 as indicated in FIG. 4, the ray bundles from each field point may sample the same portion of the switching element 404. Defects in the switching element 404 may be integrated similarly by the two ray bundles, and the resulting artifacts may manifest as a uniform change in brightness over the entire screen.

Comparing to an alternative embodiment, in which a switching element (not shown) is placed outside the lens, ray bundles from the center 401A and edge 401B of the panel sample the switching element at distinctly different locations. A defect in one location of the switching element (not shown) will alter one ray bundle without altering the other. The result is an artifact in one portion of the image that is not visible in the rest of the image. The human eye is very sensitive to such non-uniformities or artifacts in images, resulting in an unpleasing viewing experience.

Another benefit of placing the switching element 404 within the lens arrangement 110, particularly closer to or proximate to the aperture stop 104, may be that the overall switching element package is smaller, leading to more compact packaging of the system and potentially lower system costs.

Figure 5:
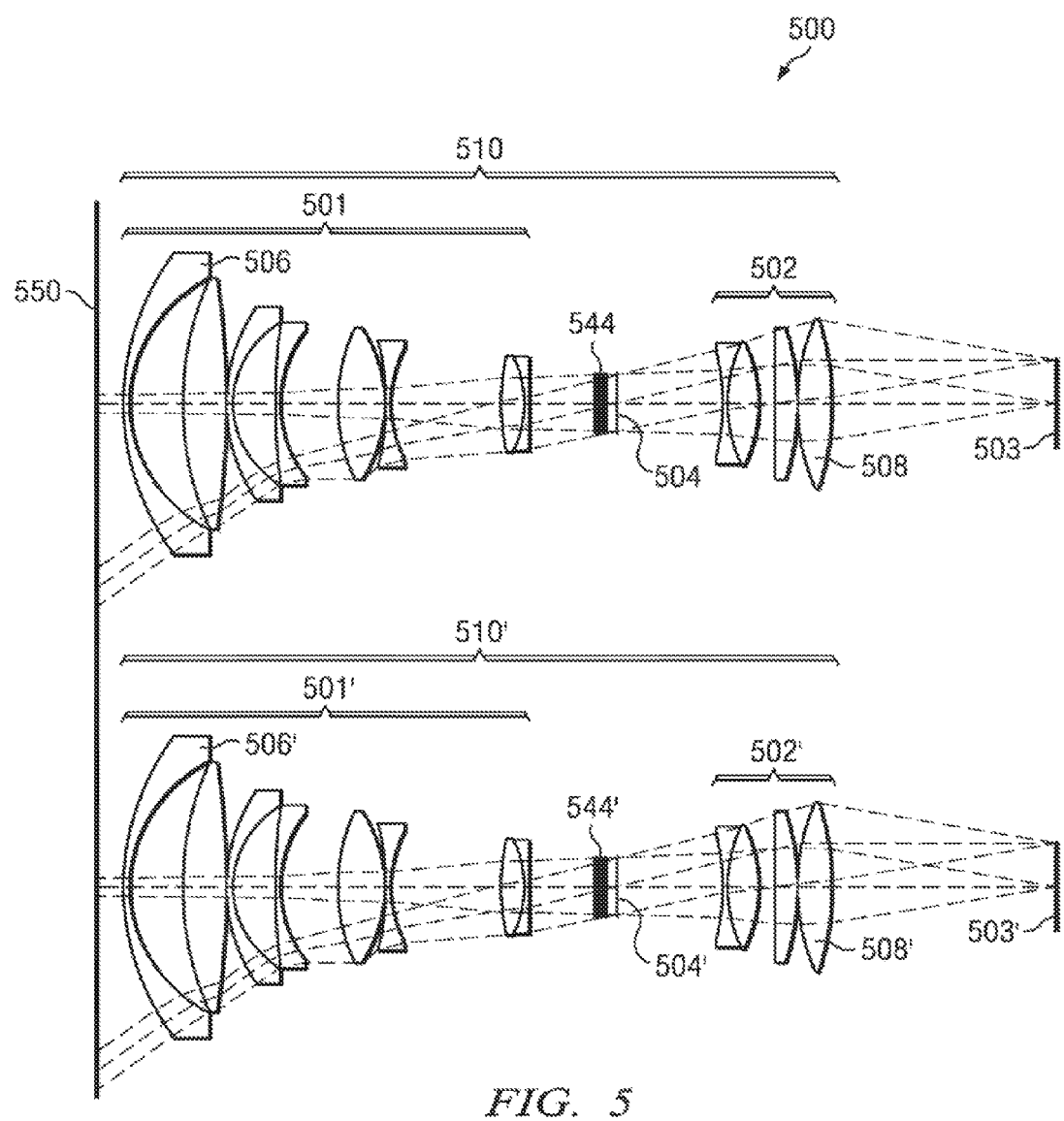
FIG. 5 is a schematic diagram illustrating an embodiment of a dual-projector system in accordance with the present disclosure.

FIG. 5 is a schematic diagram illustrating an exemplary embodiment of dual-projector system 500 operable to provide stereoscopic images in accordance with the present disclosure. The dual-projector system 500 includes a panel 103 operable to output light along a light path and a lens arrangement 110 disposed in the light path. The lens arrangement 110 may include a first power group 101, a second power group 102, and an aperture stop 104 disposed between the first and second power groups 101, 102. The dual-projector system 500 may include an optical component 404 disposed in the light path between a first lens 106 of the first power group 101 and a second lens 108 of the second power group 102. The dual-projector system 500 may further include a projection screen 401 operable to receive light provided by the lens arrangement 110 along the light path. In addition to the lens arrangement 110, the dual-projector system 500 may have a second lens arrangement 110' operable to receive light from the panel 103 along a second light path. The second lens arrangement 110' may include a first power group 101', a second power group 102', and an aperture stop 104' disposed between the first and second power groups 101', 102' of the second lens arrangement 110'. The dual-projector system 500 may include an second optical component 404' disposed in the second light path between a first lens 106' of the first power group 101' of the second lens arrangement 110' and a second lens 108' of the second power group 102' of the second lens arrangement 110'. The projection screen 401 is operable to receive light provided from the second lens arrangement 110' along the second light path.

In some embodiments, the above described projection systems 300, 400, and 500 may be configured for operation in 2D and 3D modes. For 3D mode, a modulation element and/or other applicable optical components may be located in the optical path. For higher system efficiency in 2D mode, the modulation element and/or other applicable optical components may be moved out of the optical path by an actuating mechanism such as a slider. The actuating mechanism may be manual, automatic, or semiautomatic. Since the projection lens design accounts for the modulation element and/or other applicable optical components when it is in place, a dummy glass flat may be inserted in the optical path during 2D mode, or the air spacing between positive and negative groups may be increased to account for the modulation element's and/or other applicable optical components' optical path length. Removing the optical component in 2D mode may also increase the product lifetime of the switching element, since it is less exposed to high-energy light and heat when it is outside of the optical path.

A modulation element may also be implemented as a passive polarization modulator converter that is rotated in synchronization with the left and right eye images on the panel (for example, the "wheel" described above). By locating the wheel closer to or proximate to the aperture stop of the projection lens, it may be possible to achieve better contrast and contrast uniformity in the final image, and a more compact system. Additionally, the illumination spot size may be configured to be smaller at the aperture stop (versus outside the lens) allowing for sharper transitions between polarization states with smaller wheel sizes. Exemplary polarization switching elements are described in commonly-owned U.S. Patent Pub. Appl. No. 2009/0128780. In an exemplary embodiment, the wheel need not be removed from the beam when switching between 2D and 3D modes. Rather, the eyewear can simply be removed for 2D operation, and if desired to increase 2D brightness, the input polarizer can be placed on a slider.

Some embodiments of the present disclosure may include an input polarizer, which may be modified to avoid the repercussions of thermal loading. For instance, a wire grid (reflective) polarizer can be used, which is physically separated from the other elements of the switch. The non-uniform heating due to polarizer absorption can otherwise induce birefringence in glass elements, degrading system contrast. The wire grid polarizer can further be tilted to dump the orthogonal polarization and avoid coupling of reflected light into the projected image. A fan may further be used to maintain acceptable thermal conditions. Absorptive wire grid polarizers may also be utilized for durability and stray light prevention.

Additional measures may further be utilized to achieve adequate product lifetime in view of the intense light in this location. Liquid crystal switches contain organic materials that degrade in high luminance/heat environments. In an embodiment according to the present disclosure, devices utilize inorganic alignment materials, low stress-optic glass, and LC fluids that are less prone to degradation in such an environment.

Likewise, color-separation systems may benefit from locating the dielectric or retarder film elements closer to or proximate to the projection lens aperture stop (versus outside of the projection lens). The benefits are better contrast and contrast uniformity, sharper state transitions, and a more compact system. However, it is understood that most color-separation systems place the filtering elements in the illumination path.

Finally, in typical projection lens designs, ray bundles from the panel emerge at the aperture stop as essentially collimated rays. Placing the an optical element in collimated ray space means that little or no additional aberrations will be induced by the optical element, and the element can be tilted (to reduce stray light reflections) without additional aberration consequence.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A projection system operable to provide stereoscopic images, comprising:
   a projection lens arrangement disposed in a light path to receive image light, the projection lens arrangement comprising:
      a first power group;
      a second power group; and
      an aperture stop disposed between the first and second power groups;
   an optical component disposed between the first power group and the second power group;
   wherein the optical component comprises a polarization switch; and
   wherein the polarization switch is configured to receive the image light and output switching polarized image light from the projection lens arrangement towards an output image path.

2. The projection system of claim 1, wherein the optical component is disposed between the first power group and the aperture stop.

3. The projection system of claim 2, wherein the optical component is adjacent to the aperture stop.

4. The projection system of claim 2, further comprising a second optical component disposed between the second power group and the aperture stop.

5. The projection system of claim 1, wherein the first power group further comprises a second lens disposed between the aperture stop and a first lens of the first power group.

6. The projection system of claim 1, wherein the second power group further comprises a second lens disposed between the aperture stop and a first lens of the second power group, the projection system further comprising a second optical component disposed between the first and second lenses of the second power group.

7. The projection system of claim 1, wherein the second power group further comprises a second lens disposed between the aperture stop and a first lens of the second power group, the projection system further comprising a second polarization switch between the second power group and the aperture stop.

8. The projection system of claim 7, wherein the second optical component is adjacent to the aperture stop.

9. The projection system of claim 1, wherein the first power group is a positive power group and the second power group is a negative power group.

10. The projection system of claim 1, wherein the first power group is a negative power group and the second power group is a positive power group.

11. The projection system of claim 1, wherein the polarization switch comprises a modulator.

12. The projection system of claim 1, the system further comprising:
a second projection lens arrangement disposed in a second light path to receive image light, the second projection lens arrangement comprising:
a first power group of the second lens arrangement;
a second power group of the second lens arrangement; and
and an aperture stop disposed between the first and second power groups of the second projection lens arrangement;
a second optical component disposed between the first power group of the second projection lens arrangement and the second power group of the second projection lens arrangement;
wherein the second optical component comprises a polarization switch; and
wherein the second polarization switch is configured to receive the image light and output switching polarized image light from the second projection lens arrangement towards a second output image path.

13. A projection system operable to provide stereoscopic images, comprising:
a panel operable to output light along a light path a lens arrangement disposed in the light path, the lens arrangement comprising:
a first power group;
a second power group; and
an aperture stop disposed between the first and second power groups;
an optical component, the optical component disposed in the light path between a first lens of the first power group and a second lens of the second power group; and
a projection screen operable to receive light provided by the lens arrangement along the light path.

14. The projection system of claim 13, wherein the optical component is disposed between the first power group and the aperture stop.

15. The projection system of claim 14, wherein the optical component is adjacent to the aperture stop.

16. The projection system of claim 13, the system further comprising:
a second lens arrangement operable to receive light from the panel along a second light path, the lens arrangement comprising:
a first power group of the second lens arrangement;
a second power group of the second lens arrangement; and
an aperture stop of the second lens arrangement disposed between the first and second power groups of the second lens arrangement; and
a second optical component, the second optical component disposed in the second light path between a first lens of the first power group of the second lens arrangement and a second lens of the second power group of the second lens arrangement;
wherein the projection screen is operable to receive light provided from the second lens arrangement along the second light path.

17. A method of projecting stereoscopic images on a screen, comprising:
providing a projection lens arrangement disposed in a light path to receive image light;
directing light exiting the projection lens arrangement along an output image path;
wherein the projection lens arrangement comprises:
a first power group;
a second power group;
an aperture stop disposed between the first and second power groups; and
a polarization switch disposed between the first power group and the second power group, wherein the polarization switch is configured to receive the image light and output switching polarized image light from the projection lens arrangement towards an output image path.

18. The projection system of claim 17, wherein the polarization switch is disposed between the first power group and the aperture stop.

19. The projection system of claim 18, wherein the polarization switch is adjacent to the aperture stop.

* * * * *